United States Patent Office 2,957,924
Patented Oct. 25, 1960

2,957,924
OXYCHLORINATING OF ALKANES

Theodore W. Heiskell and Frederick Chris Dehn, New Martinsville, W. Va., assignors to Columbia-Southern Chemical Corporation, Allegheny County, Pa., a corporation of Delaware No Drawing. Filed Feb. 25, 1958, Ser. No. 717,337

9 Claims. (Cl. 260—662)

The present invention relates to the production of chlorinated hydrocarbons. More particularly, the present invention relates to a method of controlling the chlorination of hydrocarbons in processes employing gaseous hydrogen chloride as a source of chlorine.

It has been proposed to chlorinate lower aliphatic hydrocarbons utilizing gaseous hydrogen chloride as a chlorinating agent. In processes of this type, gaseous hydrogen chloride, an oxygen containing gas such as air, and the hydrocarbon to be chlorinated are passed in contact with a metal halide catalyst. HCl is consumed in these reactions and the organic feed is chlorinated. In another modification of this process, elemental chlorine ($Cl_2$) is used as the feed gas in place of gaseous hydrogen chloride. This latter process operates in a manner similar to the first except that an initial chlorination of the hydrocarbon takes place. Thus, free chlorine, an oxygen containing gas and the hydrocarbon to be chlorinated, are passed in contact with a metal halide catalyst. The chlorine reacts with the hydrocarbon to produce hydrogen chloride and a chlorinated product of the hydrocarbon. Hydrogen chloride produced in this manner is consumed and its chlorine content is utilized with the result that there is additional chlorination of hydrocarbon feed.

Although chlorinations of this type are well known in the art, there are serious operational difficulties generally associated with them. Thus, for example, it is found that the reaction takes place in localized areas of "hotspots" which results frequently in uncontrollable temperatures within the catalyst beds and reactors employed. In addition, the catalysts employed and the atmospheres encountered in reactors during processes of this type are extremely corrosive. As a result of these corrosive catalysts and atmospheres considerable destruction of reactor walls is encountered due to corrosion seriously impairing the economic feasibility of employing such processes. Further, the catalyst employed in these procedures is rapidly contaminated or poisoned with products of corrosion which seriously shortens catalyst life. Quite frequently low utilization of chlorine or hydrogen chloride feed is also experienced.

The term "utilization" as used herein on conjunction with the HCl and $Cl_2$ feed materials employed refers to the amount of chlorine as HCl or $Cl_2$ fed to the system which is recovered as a chlorinated product. The values given are expressed as percentage by weight of chlorinating material fed. Thus an HCl utilization of 70 percent indicates that 70 percent by weight of chlorine fed as HCl to the system was recovered as chlorinated product.

By the method of the present invention many of the problems normally associated with the chlorination contemplated herein can be eliminated or controlled to a considerable extent. Thus, longer life in reactors is made possible due to substantial reduction in the corrosion rates normally encountered in processes such as these. In addition to reducing corrosive attack on reactors catalyst life is greatly increased and "hotspot" temperatures controlled within tolerable limits. In addition excellent HCl and $Cl_2$ utilizations are obtained while achieving the desirable operational advantages enumerated above.

Thus it has been found according to the present invention that by carefully controlling the temperature of the reactor walls in contact with the catalyst masses within a narrow range of temperatures while maintaining the catalyst temperatures high enough to produce chlorinated product efficiently, the hereinbefore enumerated advantages can be obtained. The process of the invention involves the constant cooling of reactor walls so as to provide an inner wall temperature of the reactors which is cool enough to resist corrosion by the atmospheres associated therewith but not enough not to stop the reaction taking place in the catalyst zone contacting the inner reactor wall. Consequently it has been found that in the chlorination of aliphatic hydrocarbons containing 1 to 4 carbon atoms and their incompletely chlorinated derivatives in the gaseous phase by reacting the material to be chlorinated with an oxygen containing gas and a chlorinating agent in the presence of a metal halide catalyst, corrosion of the reactor can be prevented by contacting the outer reactor wall with a heat exchange medium maintained at temperatures between about 325° C. and about 400° C. By continuously providing a contact between the outer reactor wall and a heat exchange medium maintained within the narrow range of temperature above set forth the inner walls of the reactors are cooled sufficiently to resist attack by the corrosive atmospheres within the reactors but are still hot enough not to impair the efficiency of the chlorination procedure taking place in the catalyst zones defined by these cooled walls.

Control of reactor wall temperatures is readily accomplished by jacketing the reactors employed and circulating a heat exchange medium through the jacket. Since according to this invention a close control of the heat exchange medium is imperative if beneficial results are to be achieved, a thermoregulating device is provided and kept in constant contact with the heat exchange medium. Suitable heaters such as strip heaters or other conventional heating devices are placed in contact with the jacket or the medium and electrically connected to the thermoregulator to provide close temperature control of the heat exchange medium to maintain it between 325° C. and 400° C.

Processes of this type are conducted in the presence of a metal halide catalyst. The metal used in the catalyst is one of variable valence such as copper, chromium, iron, and the like, and may be employed alone or in combination with other metals such as sodium, potassium, and the like. Preferably, catalysts are in the form of metal chloride salts and are impregnated on an inert material which provides considerable surface area for the process reactants to contact the catalyst. Various carriers may be employed such as, for example, silica gel, aluminum, kieselguhr, pumice and other well known carrier materials. A particularly suitable material is Celite 22, a calcined diatomaceous earth (Lompoc, California diatomite) sold by the Johns-Manville Corporation, under the name Celite 22. This material impregnated with a cupric chloride-potassium chloride catalyst has been found particularly desirable in conducting reactions of the type herein contemplated.

A free or elemental oxygen ($O_2$) containing gas is employed in accordance with this invention. Thus, elemental oxygen ($O_2$) is found suitable for use in the process and may be employed alone or mixed with various inert diluents such as nitrogen, argon, neon, and the like. Air comprises a particularly suitable gas for supplying elemental oxygen to the process since it is easily obtained and inexpensive. Other types of oxygen containing gases, i.e., gases which contain elemental oxygen ($O_2$) therein may also be employed. Thus oxygen enriched air, oxygen or air mixed with inert gases or vapors or mixtures of oxygen, air and inert gases or vapors may be conveniently utilized in accordance with the teachings of the present invention without impairing results in any way.

Chlorinating agents employed in accordance with the practice of this invention are elemental chlorine, gaseous HCl and mixtures of gaseous HCL and elemental chlorine. Preferably the chlorinating agents are fed to the reactors in the anhydrous state but the observance of strict anhydrous conditions in the chlorinating agent feed is not necessary to successfully conduct the chlorinations contemplated herein.

Temperatures employed within the catalyst beds or zones themselves may be varied considerably without detrimental effect. Thus temperatures between 325° C. and 700° C. may be employed. Preferably catalyst temperatures are maintained between about 400° C. and 650° C. A temperature differential between the catalyst and the heat exchange medium is established ranging from between 30° C. and about 375° C. Preferably the temperature differential between the heat exchange medium and the catalyst is established in a range of between about 30° C. and about 300° C.

The catalytic tubular reactors employed therefore, having inner and outer walls, characteristically present a hot catalyst bed to reactant feed material while at the same time presenting a cooled inner reactor wall in contact with the catalyst. The heat exchange medium is in direct heat exchange relationship with the outer wall of the reactor and effectively controls the temperature of the inner reactor wall which is in direct contact with the catalyst. The temperature gradient between the heat exchange medium and the inner reactor wall surface is about 5° C. and consequently presents a wall surface in contact with the hot catalyst which is considerably cooler than the prevailing temperatures occurring within the catalyst itself due to the close temperature control maintained on the heat exchange medium.

Pressure conditions may be varied considerably without seriously interfering with the process of this invention. While it is preferred to operate the system herein described at or near atmospheric pressure for operational convenience, both superatmospheric pressures and subatmospheric pressures may be utilized if desired.

The process of the present invention is especially effective when the chlorination reactions are accomplished in tubular or elongated reactors; i.e., reactors of considerable length as contrasted with their internal diameter. Thus their length is between 8 to 600 times their internal diameter. The diameter of the tubular reactors utilized may vary considerably without detrimental effect. Thus, tubes with internal diameters of the order or ¼ of an inch are found effective and tubes with diameters of 4 inches are also permissible. Preferably, tubular diameters of between 1 inch and 3 inches are employed. Preferably, the reactors are fabricated of mild steel, nickel or other suitable structural metal but they may also be suitably coated on their inner walls with ceramic material if desired.

The residence time of gases in catalyst zones is subject to variation without seriously effecting the results. Thus, while preferably reactant feed rates are adjusted so as to provide a residence time for reactant gases in the catalyst beds of between about 0.5 to about 3 seconds, reactant gas feed rates may be adjusted to provide residence times as short as 0.2 second to as long as 10 seconds or longer and still maintain an efficient process.

Chlorinating procedures of the type encountered in the process of this invention are exothermic in nature. Removal of heat from the gas stream is thus desirable. This may be accomplished by use of an adequate heat exchange system associated with the reactors employed. By jacketing the reactors, and circulating therein a cooling medium it is possible to obtain efficient control of bed temperatures. The maintenance of this control is accomplished by inserting thermoregulating devices in the heat exchange medium, so that a close temperature control of the medium itself is provided for. A molten salt mixture of $KNO_3$, $NaNO_2$, and $NaNO_3$ constantly circulated throughout the reactor jacket has been found particularly suitable though any other heat exchange medium may be employed which will effectively operate within the range of temperature control necessary to accomplish the results desired.

The feed ratios of the various components of the feed gases reacted in the catalyst zones in accordance with this invention may be subjected to considerable variation without seriously interfering with the process. Thus, for example, the chlorinating agent employed may be fed to the system at a rate such that from between 0.5 mole to about 5 moles or even more chlorinating agent is supplied for each mole of hydrocarbon fed. Less than 0.5 mole of chlorinating agent may be utilized for each mole of hydrocarbon fed in the process of this invention but will usually result in supplying too small a quantity of chlorine to completely chlorinate all of the hydrocarbon feed. Employment of chlorinating agent in excess of 5 moles for each mole of hydrocarbon employed is likewise permissable though chlorine will be supplied in quantities greater than necessary to completely chlorinate all the hydrocarbon fed.

The rates of feed employed for the oxygen containing gas is also variable. Enough oxygen is supplied to insure oxidation of the chlorinating medium and still provide some unreacted oxygen in the exit gas stream. Considerable amounts of excess oxygen may be employed if desired but quantities supplying more than 5 percent by volume free oxygen in the exit gas stream are not particularly beneficial. Thus if the oxygen content of the feed gas is maintained so that between about 0.2 mole and 1.5 moles of free oxygen are supplied to the system for each mole of chlorinating agent employed, beneficial results are achieved.

The process of the present invention is designed for the production of chlorinated hydrocarbon products of saturated lower aliphatic hydrocarbons containing from 1 to 4 carbon atoms. While hydrocarbons such as methane, ethane, propane and butane are generally employed as the starting hydrocarbon feed material, it is, of course, understood that partially chlorinated hydrocarbons containing from 1 to 4 carbon atoms may also be employed as feed material either as initial feed or as a recycle from the product gas stream. Thus, partially chlorinated methane, ethane, propane and butane products such as methyl chloride, ethyl chloride, chloroform, trichloroethylene, 1-chloropropane, 1-chlorobutane, and the like, may be employed alone or in a mixture with other partially chlorinated hydrocarbons or with saturated hydrocarbon feed materials containing from 1 to 4 carbon atoms. In addition to the employment of partially chlorinated hydrocarbons as feed it is, of course, possible to recycle nonchlorinated saturated and unsaturated hydrocarbons from the product gas stream into the feed stream for chlorination. Employment of recycled portions of the product gas stream allows for the control of the composition of the product gas stream so that a preponderance of one particular product in this stream can be achieved. Thus, in a methane chlorinating procedure, for example, carbon tetrachloride can be produced almost exclusively by simply recycling all the partially chlorinated products back into the reactors with the feed materials.

Therefore, the process of the present invention includes chlorination of aliphatic hydrocarbon having from 1 to 4 carbon atoms and their incompletely chlorinated derivatives. The incompletely chlorinated derivative may comprise chlorine addition and substitution p ucts of aliphatics having 1 to 4 carbon atoms. Preferably compounds fed to the system are chlorinatable aliphatic compounds having the formula:

$$C_nH_mX_r$$

where X represents chlorine, $n$ is an integer from 1 to 4, $m$ is an integer of at least 1 and the sum of $m+r$ is $2n+2$, $2n$ or $2n-2$. Generally the feed comprises compounds in which the sum of $m+R$ is $2n+2$. When considerable recycle of products is performed compounds in which the sum of $m+r$ is $2n$ and $2n-2$ are encountered as feed.

Products formed by the reactions occurring in the present invention are numerous and varied, and depend upon the particular hydrocarbon feed employed. Thus when butane or propane are employed more products are formed than when ethane or methane are used as feed. Saturated and unsaturated compounds are produced. Thus when butane is used as the hydrocarbon feed, for example, methyl chloride, methylene chloride, chloroform, carbon tetrachloride, butyl chloride, dichlorobutane, ethyl chloride, propyl chloride, ethane, ethylene, propane, propylene, methane and the like are produced. When propane, ethane or methane are employed the variety of products decreases when the number of carbon atoms contained in the hydrocarbon feed gas decreases.

Product recovery from systems conducted in accordance with this invention may be accomplished by employing various well known techniques. Thus carbon absorption trains, dry ice cold traps and fractional distillation procedures or combinations of these procedures may be conveniently employed to separate the multitude of products present in product gases emanating from these processes. The higher the carbon content of the hydrocarbon feed employed the more numerous the products formed and consequently the more intricate the recovery system necessary to separate product gas into its components.

In operation of the process of the present invention, a tubular reactor is charged throughout a substantial portion of its length with a metal halide catalyst impregnated on inert carrier material. Screens and plugs are provided at either end of the reactor to hold the catalyst in place. A molten salt mixture is circulated constantly through a jacket which encloses all of the reactor tube containing the catalyst, and is connected to a thermoregulating system so as to maintain a temperature salt bath in the jacket which remains between 325° C. and 400° C. A mixture of the hydrocarbon to be chlorinated, an oxygen containing gas and a chlorinating agent selected from the group consisting of HCl, Cl₂ or a mixture of HCl and Cl₂ are fed into the reactor at one end. The gaseous reactant products are removed at the end of the reactor opposite the feed inlet. During the entire period of chlorination the salt bath temperature is maintained so that it is not permitted to fall below 325° C. or to rise above 400° C.

By the method of the present invention it is now possible to continuously chlorinate a lower aliphatic hydrocarbon such as methane, ethane, propane, or butane and still maintain a close control over operational difficulties usually encountered in these chlorinations, especially corrosion of reactors. As long as the temperature of the heat exchange medium is maintained within the defined limits hereinbefore set forth, the operational advantages enumerated before are obtainable. It is found, however, that when the temperature of the heat exchange medium exceeds the upper limit or falls below the lower limit of temperature to be maintained, one or more of the advantages otherwise obtainable are lost. Corrosion of reactor walls is markedly increased as temperatures above 400° C. are experienced in the heat exchange medium. As the temperature of the heat exchange medium falls below 350° C. utilizations decline sharply and quite frequently the reaction ceases entirely.

The following examples are illustrative of the manner in which the present invention may be performed.

EXAMPLE I

A catalyst was prepared by dissolving 441.0 grams of CuCl₂·2H₂O and 186.8 grams of KCl in 1000 milliliters of distilled water. One thousand milliliters of Celite pellets (⅛ inch x 3/16 inch), were added to the solution and allowed to soak for a period of 24 hours at ambient temperature (25° C.). The supernatant liquor (860 milliliters) was drained off and the pellets dried with a Westinghouse sun lamp at a temperature of 110° C. The dried pellets had a solids loading of 33.1 percent by weight of salts in solution corresponding to 7.82 percent copper, 5.48 percent potassium and 13.65 percent chloride ion by weight of impregnated carrier.

EXAMPLE II

An 8½ foot uncoated vertically disposed reactor tube 1½ inches in internal diameter and fabricated of mild steel was charged with 88 inches of the catalyst as prepared by Example I. The tube was screened and plugged so as to provide 7 inches on either end of the reactor tube free of catalyst. A mild steel insulated jacket was placed around the 98 inch section of the reactor containing the catalyst and provided with side arms at the top and bottom. The jacket side arms were connected to a mild steel reservoir 3 inches in diameter and charged with a salt mixture comprising by weight 53 percent KNO₃, 40 percent NaNO₂ and 7 percent NaNO₃.

The outside of the reservoir was fitted with strip heaters and a thermoregulator placed in the reactor jacket in communication with the salt bath about one fourth of the way down from the top of the reactor tube. Suitable connections between the thermoregulator and the heaters were made so as to provide automatic control of the salt bath temperature. The heaters were activated and the salt melted and held at a temperature of 370° C. A mechanical stirrer in the reservoir was provided to insure adequate circulation of the salt bath liquid medium through the reactor jacket.

Methane was taken from a jet and metered through a calibrated orifice meter. Air was passed from a compressed air tap, through a glass wool filter, the pressure reduced to between 4 and 5 pounds per square inch gauge and metered through an orifice meter. Anhydrous HCl was taken from a cylinder through a stainless steel needle valve and metered through a rotameter. The methane, air and HCl were mixed and passed into the reactor at the top.

A tubular tap at the bottom of the reactor was provided and connected to a vapor phase chromatographic gas analyzer for periodic analysis of the exit gas stream issuing from the reactor. The methane, air and HCl feed components were regulated to provide varying contact times in the catalyst bed. The chloromethane products were collected by condensation in a cold trap. The results are shown in Table I.

Table I

|  | Run 1 | Run 2 | Run 3 |
| --- | --- | --- | --- |
| Molar Feed Ratio: |  |  |  |
| CH₄ | 1.00 | 1.00 | 1.00 |
| HCl | 2.15 | 2.15 | 2.15 |
| Air | 5.5 | 5.5 | 5.5 |
| Contact Time (Seconds) | 2.5 | 2.0 | 1.5 |
| Pounds Product Per Pound Catalyst Per Hour | 0.102 | 0.110 | 0.118 |
| Percent HCl Utilization | 90.5 | 80.4 | 76.5 |
| Hotspot, ° C | 460 | 480 | 596 |
| Bath Temperature, ° C | 370 | 370 | 370 |
| Grams Product Per Hour | 147.5 | 160.0 | 171.3 |
| Mole Percent of Product Compounds: |  |  |  |
| CCl₄ | 10.8 | 12.4 | 8.6 |
| CHCl₃ | 37.0 | 37.1 | 31.6 |
| CH₂Cl₂ | 38.5 | 37.9 | 39.3 |
| CH₃Cl | 13.7 | 12.6 | 20.5 |

Similar results are achieved when elemental chlorine and mixtures of elemental chlorine and HCl are employed in place of HCl.

EXAMPLE III

A 30 inch uncoated vertically disposed reactor tube 1 inch in diameter and fabricated of mild steel was charged as follows with the catalyst. The reactor tube was screened and plugged to provide 2 inches of free space on either end of the tube. Three inches of Raschig rings (¼ inch in diameter) were placed on the bottom screen and 14 inches of catalyst containing Celite pellets prepared according to Example I placed on top of the Raschig rings. Ten inches of non-impregnated Celite pellets were then placed on top of the impregnated particles.

A mild steel insulated jacket was placed around the 26 inch section of the reactor containing the Raschig rings and all of the Celite particles. The jacket was provided with side arms which were connected to a mild steel reservoir 2 inches in diameter and charged with a salt mixture comprising by weight 53 percent $KNO_3$, 40 percent $NaNO_2$ and 7 percent $NaNO_3$.

The jacket was thermally regulated in the same manner as the jacket of Example II except that the bath temperature was maintained at 425° C. Methane, air and chlorine were fed to the reactors in the same manner that methane, air and HCl were fed to the system in Example II. Product gas analysis and collection were conducted as in Example II. The results are shown in Table II.

Table II

|  | Run 1 | Run 2 | Run 3 |
|---|---|---|---|
| Molar Feed Ratio: |  |  |  |
| $CH_4$ | 1.0 | 1.0 | 1.0 |
| $Cl_2$ | 3.0 | 3.0 | 3.0 |
| Air | 7.5 | 7.5 | 7.5 |
| Contact Time (Seconds) | 1 | 1 | 1 |
| Pounds Product Per Pound Catalyst Per Hour | 0.21 | 0.245 | 0.266 |
| Percent $Cl_2$ Utilization | 89.7 | 90.4 | 89.4 |
| Hotspot, °C | 490 | 506 | 490 |
| Bath Temperature, °C | 425 | 425 | 425 |
| Grams Product Per Hour | 45.7 | 53.4 | 57.8 |
| Mole Percent of Product Compounds: |  |  |  |
| $CCl_4$ | 25.8 | 22.8 | 30.0 |
| $CHCl_3$ | 43.6 | 43.4 | 41.3 |
| $CH_2Cl_2$ | 19.1 | 26.7 | 21.8 |
| $CH_3Cl$ | 11.5 | 6.7 | 7.0 |

It is found in comparing the reactors employed in Example II and Example III that considerably more corrosion takes place in the reactor of Example III which operates with a bath temperature above 400° C. The reactor tube of Example III experienced a corrosion rate of 0.14 inch per year. The reactor tube of Example II on the other hand experienced considerably less corrosion and over a three month period of operation experienced a corrosion rate of only 0.04 inch per year.

While the invention has been described with reference to certain specific examples, it is not intended that these be taken as limitations on the scope of the invention. For example, while the invention has been particularly described with reference to methane, it can be carried out with ethane, propane, butane and incompletely chlorinated derivatives of these compounds. As long as the temperature of the heat exchange medium is maintained within the defined limits the superior operational conditions hereinbefore described will be obtained. The invention therefore is not to be limited in scope except insofar as appears in the appended claims.

We claim:

1. A process for the chlorination of aliphatic hydrocarbons containing from 1 to 4 carbon atoms and their incompletely chlorinated derivatives in the gaseous phase comprising contacting the material to be chlorinated, an oxygen containing gas and a chlorinating agent selected from the group consisting of HCl, $Cl_2$ and mixtures of HCl and $Cl_2$ with a copper chloride catalyst contained in an elongated reactor having an inner and an outer wall, contacting said outer wall with a heat exchange medium in direct heat exchange relationship therewith and maintaining said medium at a temperature between about 325° C. and about 400° C.

2. The process of claim 1 wherein the heat exchange medium is maintained at a temperature of about 370° C.

3. A process for the chlorination of aliphatic hydrocarbons containing from 1 to 4 carbon atoms and their incompletely chlorinated derivatives in the gaseous phase comprising contacting the material to be chlorinated, an oxygen containing gas and HCl with a copper chloride catalyst contained in an elongated reactor having an inner and an outer wall, contacting said outer wall with a heat exchange medium in direct heat exchange relationship therewith and maintaining said heat exchange medium at a temperature between about 325° C. and about 400° C.

4. A process for the chlorination of aliphatic hydrocarbons containing from 1 to 4 carbon atoms and their incompletely chlorinated derivatives in the gaseous phase comprising contacting the material to be chlorinated, an oxygen containing gas and $Cl_2$ with a copper chloride catalyst contained in an elongated reactor having an inner and an outer wall, contacting said outer wall with a heat exchange medium in direct heat exchange relationship therewith, and maintaining said heat exchange medium at a temperature between about 325° C. and about 400° C.

5. A process for the chlorination of aliphatic hydrocarbons containing from 1 to 4 carbon atoms and their incompletely chlorinated derivatives in the gaseous phase comprising contacting the material to be chlorinated, an oxygen containing gas and a mixture of HCl and $Cl_2$ with a copper chloride catalyst contained in an elongated reactor having an inner and an outer wall, contacting said outer wall with a heat exchange medium in direct heat exchange relationship therewith and maintaining said medium at a temperature between about 325° C. and about 400° C.

6. The process according to claim 3 wherein the heat exchange medium maintained is at about 370° C.

7. The process according to claim 4 wherein the heat exchange medium is maintained at about 370° C.

8. The process according to claim 5 wherein the heat exchange medium is maintained at about 370° C.

9. A process for the chlorination of methane and partially chlorinated methanes in the gaseous phase comprising contacting the material to be chlorinated, an oxygen containing gas and a chlorinating agent selected from the group consisting of HCl, $Cl_2$, and mixtures of HCl and $Cl_2$ with a copper chloride catalyst contained in an elongated reactor having an inner wall and an outer wall, contacting said outer wall with a heat exchange medium in direct heat exchange relationship therewith, and maintaining said medium at a temperature between about 325° C. and about 400° C.

References Cited in the file of this patent
UNITED STATES PATENTS

| 2,636,864 | Pye et al. | Apr. 28, 1953 |

FOREIGN PATENTS

| 378,873 | Great Britain | Aug. 17, 1932 |
| 781,412 | Great Britain | Aug. 21, 1957 |

UNITED STATES PATENT OFFICE
CERTIFICATE OF CORRECTION

Patent No. 2,957,924            October 25, 1960

Theodore W. Heiskell et al.

It is hereby certified that error appears in the above numbered patent requiring correction and that the said Letters Patent should read as corrected below.

Column 3, line 55, for "or" read -- of --; column 8, line 71, for "781,412" read -- 781,414 --.

Signed and sealed this 17th day of October 1961.

(SEAL)
Attest:

ERNEST W. SWIDER            DAVID L. LADD
Attesting Officer            Commissioner of Patents

USCOMM-DC